United States Patent
Tanaka

(10) Patent No.: US 8,358,365 B2
(45) Date of Patent: Jan. 22, 2013

(54) PHOTO DETECTING DEVICE AND IMAGE PICKUP DEVICE AND METHOD THEREON

(75) Inventor: Toshiyuki Tanaka, Yokohama (JP)

(73) Assignee: Samsung Electronics Co., Ltd., Suwon-si (KR)

(*) Notice: Subject to any disclaimer, the term of this patent is extended or adjusted under 35 U.S.C. 154(b) by 270 days.

(21) Appl. No.: 12/772,285

(22) Filed: May 3, 2010

(65) Prior Publication Data

US 2010/0277629 A1   Nov. 4, 2010

(30) Foreign Application Priority Data

May 1, 2009  (JP) ................................. 2009-111856
Jan. 18, 2010 (KR) ......................... 10-2010-0004475

(51) Int. Cl.
   *G02B 13/16* (2006.01)
   *H04N 5/225* (2006.01)

(52) U.S. Cl. ......... 348/335; 348/340; 348/345; 348/348

(58) Field of Classification Search .................. 348/335, 348/340, 345, 348; 250/208.1; 257/290–292
   See application file for complete search history.

(56) References Cited

U.S. PATENT DOCUMENTS

| | | | |
|---|---|---|---|
| 5,439,621 A * | 8/1995 | Hoopman | 264/2.5 |
| 7,529,383 B2 | 5/2009 | Miyatake et al. | |
| 7,952,623 B2 | 5/2011 | Wada | |
| 2009/0045415 A1 * | 2/2009 | Koshiba | 257/80 |
| 2009/0128658 A1 * | 5/2009 | Hayasaka et al. | 348/222.1 |

FOREIGN PATENT DOCUMENTS

| | | |
|---|---|---|
| JP | 2004-146619 A | 5/2004 |
| JP | 2007-317951 A | 12/2007 |
| JP | 2008-311681 A | 12/2008 |
| JP | 4241840 B2 | 3/2009 |

* cited by examiner

*Primary Examiner* — Yogesh Aggarwal

(74) *Attorney, Agent, or Firm* — Drinker Biddle & Reath LLP

(57) ABSTRACT

A photo detecting device and method thereon capable of obtaining a color image without significant deterioration even in an optical system having a lens array. The photo detecting device includes a lens array having a plurality of lenses; and a photoelectric converter having a plurality of photoelectric conversion areas, each area comprising a plurality of pixels which generate electrical signals from light passing through a corresponding lens of the lens array and striking at least one of the plurality of pixels; wherein each of the areas has a first zone and a second zone, wherein the second zone has a spectrum sensitivity characteristic different from a spectrum sensitivity characteristic of the first zone.

19 Claims, 16 Drawing Sheets

| Mg0 | Cy0 | Y00 | Y01 | Y02 | Y03 | Ye1 | Mg1 |
|-----|-----|-----|-----|-----|-----|-----|-----|
| Ye0 | Y04 | Y05 | Y06 | Y07 | Y08 | Y09 | Cy1 |
| Y10 | Y11 | Y12 | Y13 | Y14 | Y15 | Y16 | Y17 |
| Y18 | Y19 | Y20 | Y21 | Y22 | Y23 | Y24 | Y25 |
| Y26 | Y27 | Y28 | Y29 | Y30 | Y31 | Y32 | Y33 |
| Y34 | Y35 | Y36 | Y37 | Y38 | Y39 | Y40 | Y41 |
| Cy2 | Y42 | Y43 | Y44 | Y45 | Y46 | Y47 | Ye3 |
| Mg2 | Ye2 | Y48 | Y49 | Y50 | Y51 | Cy3 | Mg3 |

| G0 | R0 | Y00 | Y01 | Y02 | Y03 | B1 | G1 |
|----|----|-----|-----|-----|-----|----|----|
| B0 | Y04 | Y05 | Y06 | Y07 | Y08 | Y09 | R1 |
| Y10 | Y11 | Y12 | Y13 | Y14 | Y15 | Y16 | Y17 |
| Y18 | Y19 | Y20 | Y21 | Y22 | Y23 | Y24 | Y25 |
| Y26 | Y27 | Y28 | Y29 | Y30 | Y31 | Y32 | Y33 |
| Y34 | Y35 | Y36 | Y37 | Y38 | Y39 | Y40 | Y41 |
| R2 | Y42 | Y43 | Y44 | Y45 | Y46 | Y47 | B3 |
| G2 | B2 | Y48 | Y49 | Y50 | Y51 | R3 | G3 |

PHOTO DETECTING DEVICE AND IMAGE PICKUP DEVICE AND METHOD THEREON

CROSS-REFERENCE TO RELATED PATENT APPLICATION

This application claims the benefits of Japanese Patent Application No. 2009-111856, filed on May 1, 2009, in the Japanese Patent Office and Korean Patent Application No. 2010-0004475, filed on Jan. 18, 2010, in the Korean Intellectual Property Office, the entire disclosures of which are incorporated herein by reference.

BACKGROUND OF THE INVENTION

1. Field of the Invention

The invention generally relates to a photo detecting device and an image pickup device, and more particularly a photo detecting device including an image pickup apparatus having a lens array.

2. Description of the Related Art

A conventional digital still camera generates a color image signal by focusing light from a subject onto an image pickup device which may be a Charge Coupled Device (CCD) image sensor or a Complementary Metal Oxide Semiconductor (CMOS) image sensor. The image pickup device generates an electrical signal representing the subject from the focused light striking the image pickup device. Recently, an image pickup apparatus with a lens array composed of a group of micro lenses arranged on a single plane between a main lens and an image sensor has been disclosed. Such an image pickup apparatus is called a Plenoptic-type image pickup apparatus.

Since a Plenoptic-type image pickup device can reconstruct an image obtained by an optical system having a lens array, the Plenoptic-type image pickup apparatus can be used to determine the Depth of Field (DOP), measure a distance using parallax, take a 3-dimensional (3D) image, and improve resolution of an image.

Since digital still cameras having a Plenoptic-type image pickup device can separately gather information for every micro lenses, they may be able to control the DOF, improve image resolution, and measure a distance using parallax. However, coloring of image data is difficult for these digital still cameras with lens arrays.

When a color image is generated from a one-chip 2D image pickup device, a general image pickup apparatus generates full color data by determining colors for every pixels by interpolation after gathering color information by applying different spectrum characteristics to every position according to a Bayer arrangement. A Bayer arrangement is an arrangement of color filters over the light sensitive pixels of the image pickup device so that the image pickup device can generate a signal indicating the colors of the subject.

When a Bayer pattern is used with Plenoptic-type image pickup devices a lot of the light information may be lost due to the filters for gathering color information. This loss may make it difficult or impossible to calculate such information as DOF.

SUMMARY OF THE INVENTION

The invention provides a photo detecting device and an image pickup device capable of obtaining a color image without significant image deterioration even in an optical system including a lens array.

A photo detecting device is disclosed. The photo detecting device including a lens array having a plurality of lenses; and a photoelectric converter having a plurality of photoelectric conversion areas, each area comprising a plurality of pixels which generate electrical signals from light passing through a corresponding lens of the lens array and striking at least one of the plurality of pixels; wherein each of the photoelectric conversion areas has a first zone and a second zone, wherein the second zone has a spectrum sensitivity characteristic different from a spectrum sensitivity characteristic of the first zone.

The first zone may include a spectrum sensitivity characteristic corresponding to a brightness signal, and the second zone comprises a spectrum sensitivity characteristic corresponding to a color signal.

Each of the plurality of photoelectric conversion areas may include the same arrangement pattern of spectrum characteristics of the pixels.

The plurality of pixels may be mounted on a generally flat surface.

The second zone may generate a color signal by using color filters.

The color filter may be a complementary color filter.

The color filter may be a primary color filter.

The color signal may include information on Cyan, Magenta, and Yellow.

The color signal may include comprises information on Red, Green, and Blue.

The plurality of lenses may be regularly arranged on a single plane.

The first zone may be generally centered on an optical axis of the corresponding lens and the second zone is outside of the first zone.

The photo detecting device may include a color signal generator for generating a color signal by performing a weighted calculation according to a distance difference between a position where the brightness signal is received and a position in which the color signal is received.

The first zone may be used for image reconstruction and the second zone is used for color reconstruction.

The second zone may be generally centered on an optical axis of the corresponding lens and the first zone is outside of the first zone.

The light may pass through a main lens before passing through the corresponding lens.

An image pickup device is disclosed. The image pickup device may include a lens array having a plurality of lenses; and a photoelectric converter having a plurality of photoelectric conversion areas, each area comprising a plurality of pixels which generate electrical signals from light passing through a corresponding lens of the lens array; wherein each of the areas has a first zone and a second zone, wherein the second zone has a spectrum sensitivity characteristic different from a spectrum sensitivity characteristic of the first zone.

A method of reconstructing an image on a photo detecting device is disclosed. The method may include generating electrical signals in each of a plurality of photoelectric conversion areas from light incident to the image passing through a corresponding lens of a lens array and striking at least one of a plurality of photoelectric conversion areas, wherein each area comprises a plurality of pixels, and each of the areas has a first zone of pixels and a second zone of pixels, and wherein the second zone of pixels has a spectrum sensitivity characteristic different from a spectrum sensitivity characteristic of the first zone of pixels.

The first zone of pixels may include a spectrum sensitivity characteristic so that the first zone generates a brightness signal, and the second zone of pixels comprises a spectrum sensitivity characteristic so that the second zone generates a color signal.

Each of the plurality of photoelectric conversion areas may include the same arrangement pattern of spectrum characteristics of the pixels.

The plurality of pixels may be mounted on a generally flat surface.

The method may include the light passing through a color filter prior to striking pixels in the second zone.

The plurality of lenses may be regularly arranged on a single plane.

The first zone of pixels may be generally centered on an optical axis of the corresponding lens and the second zone of pixels is generally outside of the first zone.

The method may include generating a color signal by performing a weighted calculation according to a distance difference between a position where the brightness signal is received and a position in which the color signal is received.

The method may include reconstructing an image using the signals from the first zone; and reconstructing a color of the image using the signals from the second zone.

BRIEF DESCRIPTION OF THE DRAWINGS

The above and other features and advantages of embodiments of the invention will become more apparent by describing in detail examples thereof with reference to the attached drawings in which:

FIG. 6 illustrates an example of a configuration of an image pickup sensor used in the image pickup device;

FIG. 7 is a magnified diagram of the image pickup sensor of FIG. 6;

FIG. 15 illustrates an example of a configuration of an image pickup sensor having attached thereto a primary color filter for obtaining information on red, green, and blue;

DETAILED DESCRIPTION OF THE INVENTION

Therefore, there is a need in the art for a photo detecting device and method thereon. The photo detecting device including a lens array having a plurality of lenses; and a photoelectric converter having a plurality of photoelectric conversion areas, each area comprising a plurality of pixels which generate electrical signals from light passing through a corresponding lens of the lens array and striking at least one of the plurality of pixels; wherein each of the photoelectric conversion areas has a first zone and a second zone, wherein the second zone has a spectrum sensitivity characteristic different from a spectrum sensitivity characteristic of the first zone.

Examples of embodiments of the invention will now be described more fully with reference to the accompanying drawings. Prior to the description of examples of embodiments of the invention, an optical system having a lens array composed of a group of micro lenses will be described along with coloring problems occurring when using such an optical system.

Figure 1:
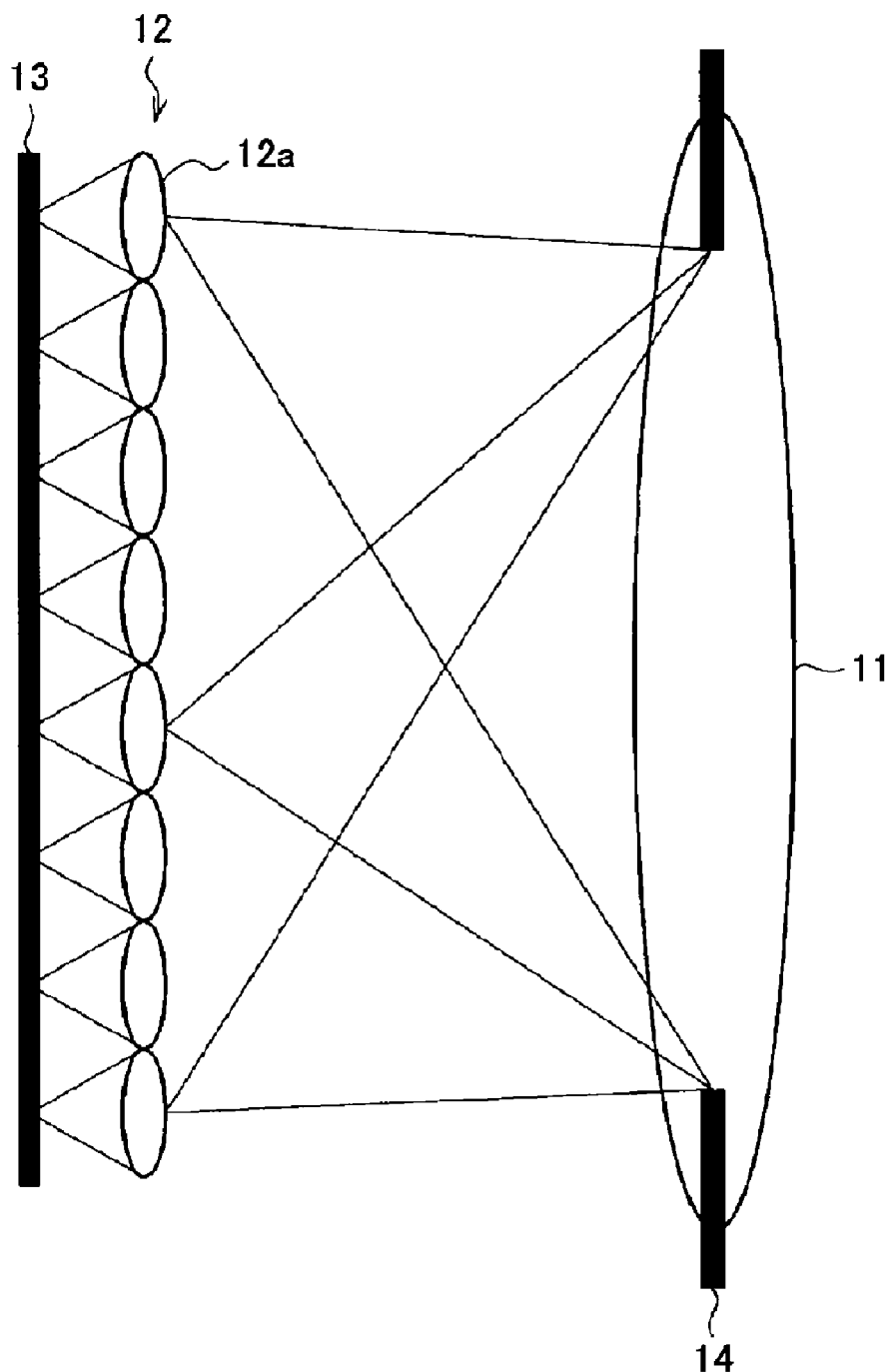
FIG. 1 illustrates an example of an optical system having a lens array composed of a group of micro lenses.
Figure 2:
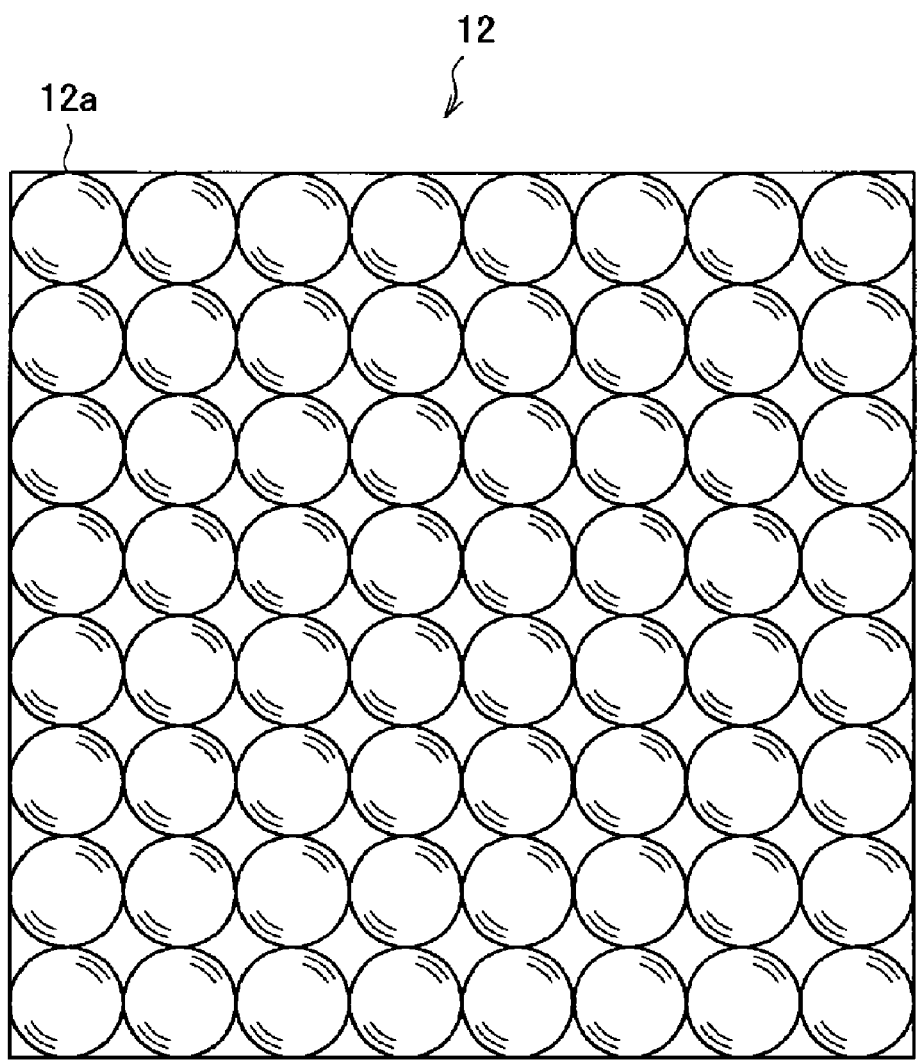
FIG. 2 illustrates an example of an optical system having a lens array composed of a group of micro lenses.

FIGS. 1 and 2 illustrate an example of an optical system having a lens array composed of a group of micro lenses. FIG. 1 illustrates a side view of an optical system having a lens array between a lens condensing light bouncing off an object and an image pickup device, and FIG. 2 is a conceptual diagram of an arrangement status of a lens array.

As illustrated in FIG. 1, in an optical system having a lens array composed of a group of micro lenses, light bouncing off an object travels through a main lens 11 and is focused on each micro lens 12a of a lens array 12. Light travels through each micro lens 12a and strikes an image pickup sensor 13.

An iris 14 of the main lens 11 is set so that light from neighboring micro lenses 12a does not overlap on the image pickup sensor 13. By reconstructing an image obtained from an optical system as illustrated in FIG. 1, the Depth of Field (DOF) can be determined. Accordingly, such an optical system having a lens array composed of a group of micro lenses can be used to measure a distance using parallax, take a 3D image, and improve image resolution.

When such an optical system is used in a digital still camera, coloring a captured image is difficult. A method of making a spectrum using a dichroic mirror and performing coloring using a plurality of image pickup sensors has been suggested, however, this method is disadvantageous in terms of a mounting space of the image pickup sensors and manufacturing costs. Thus, a method of performing coloring a captured image using a one-chip image pickup sensor has been generally used. Another method used is attaching a spectral filter on the front of a light-receiving device in a specific pattern arrangement and preparing color information for every pixels by using an interpolation process when coloring is performed using a one-chip image pickup sensor. However, when applied to an optical system having a lens array composed of a group of micro lenses, this method has several problems, which are described below.

Figure 3:
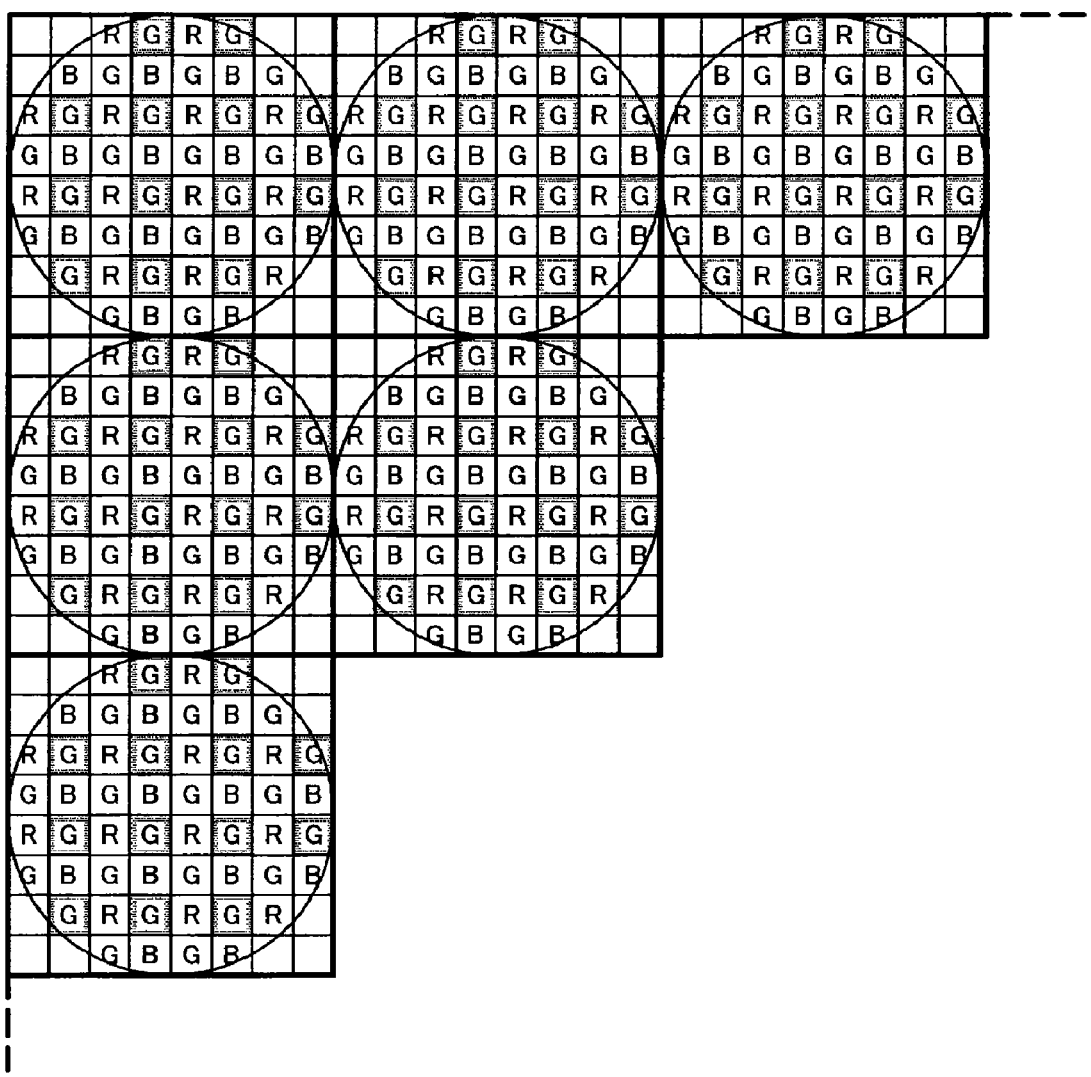
FIG. 3 illustrates an example of coloring of an image picked up in an optical system having a lens array.

FIG. 3 illustrates an example of a case of coloring an image picked up with an optical system having a lens array, by using a spectral filter having a Bayer arrangement. FIG. 3 shows an example of a case in which a block of 8×8 pixels corresponds to a single micro lens, wherein each circle indicates a projection range of the light that strikes the pixels after traveling through a single micro lens.

Since data picked up through a predetermined optical path is obtained as specific color information, a reconstruction process is performed for the same colors. However, since a pattern of the spectral filter shown in FIG. 3 contains information in a check pattern even for the most frequent green (G) component, detailed information on color status is not available.

Figure 4:
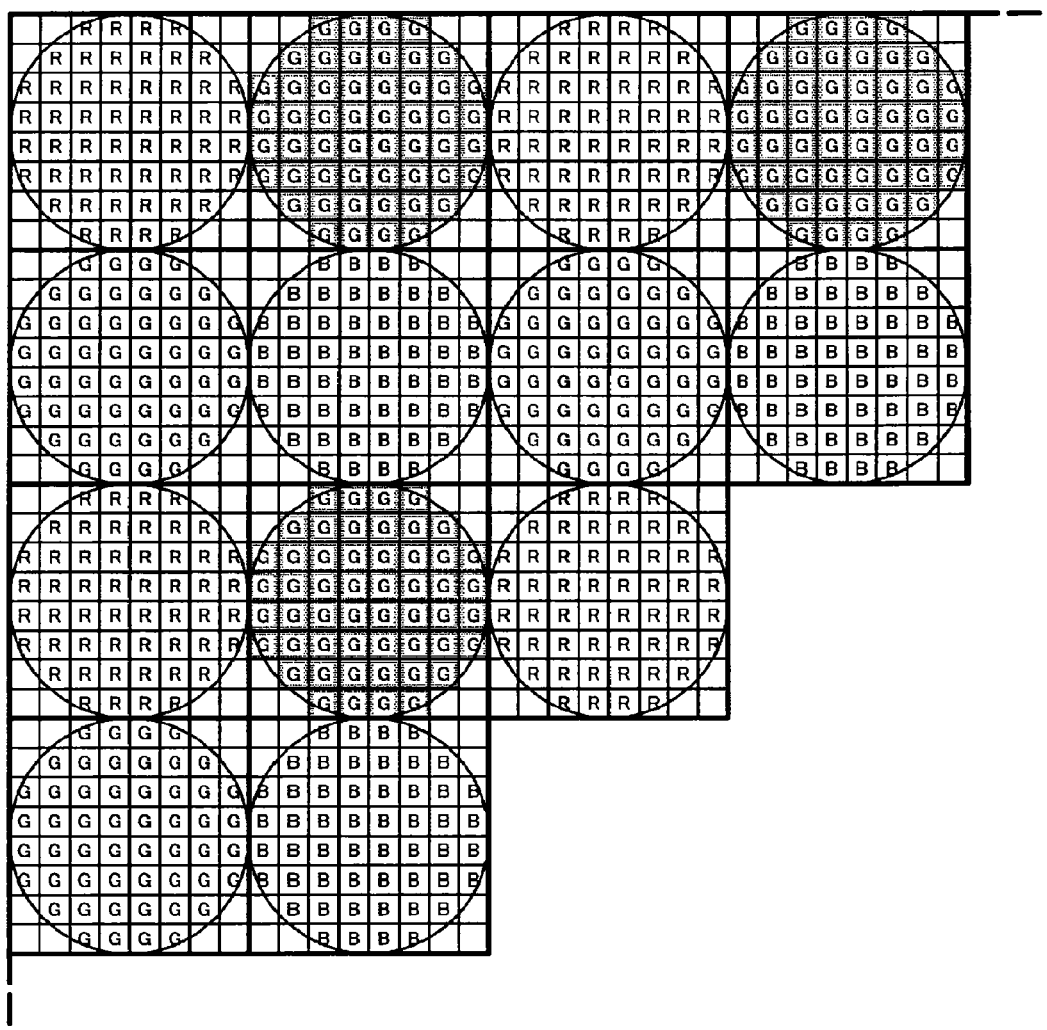
FIG. 4 illustrates an example of coloring of an image picked up in an optical system having a lens array.

In order to increase the amount of such information, a method for testing coloring of an image by changing a spectrum characteristic for each micro lens may be used. FIG. 4 illustrates an example of a case of coloring an image picked up with an optical system having a lens array by using a spectral filter having a different spectrum characteristic for each micro lens. Like FIG. 3, FIG. 4 shows a case in which a block of 8×8 pixels corresponds to a single micro lens, where each circle indicates a projection range of light that has passed through a single micro lens.

When a spectral filter having a different spectrum characteristic for each micro lens is used as illustrated in FIG. 4 in a micro lens unit, a reconstruction process of a captured image is advantageous compared to a case of using a spectral filter having a Bayer arrangement as illustrated in FIG. 3. However, since an optical system having a lens array picks up an image by further dividing information on a single pixel, the number of pixels after reconstruction decreases with the number of micro lenses. In addition, since an interpolation process is performed from the decreased number of pixels, a digital still camera having a lens array has a number of pixels smaller than a digital still camera having an ordinary optical system. When a spectral filter as illustrated in FIG. 4 is used, 64 pixels are allocated to one micro lens. Accordingly, the number of recording pixels becomes 1/64 of the number of pixels of an image pickup sensor.

When an interpolation process is performed with a fewer number of pixels, problems may occur related to mapping with predicting a non-recorded high frequency component and coloring of a boundary due to a phase transition of color information occur. The image quality deterioration of image quality may be conspicuous if the number of pixels is reduced by 1/64.

Therefore, in an embodiment of the invention described below, the pixels may be organized into two zones for each of the micro lenses. Each of the micro lenses has a projection range that is the pixels of the image pickup sensor that are struck by light that passes through the micro lens. The projection range may be called photoelectric sensitive areas. Photoelectric refers to the property of the pixels generating an electrical signal from the light striking the pixel. The projection range may be generally in the shape of a circle as can be seen in FIGS. 3, 4, 6, 7, 13, and 16. However, the shape of the projection range may be different depending on the shape of the micro lens and/or other physical structures such as filters.

In embodiments of the invention the projection range of each micro lens is divided into two zones. A first zone for generating a brightness signal and a second zone for generating a color signal. The first zone may be for image reconstruction and may be generally on an optical axis of the micro lens, which is generally in the middle of the projection range. The second zone may have color filters over the pixels to generate a color signal. Placing a color filter over a pixel that generates a signal when struck by light may be used for color information because the color filter may only permit some colors of light to pass through the filter and strike the pixel. The color filter may be a complementary color filter attached over some of the pixels. The second zone may generally be outside of the center of the projection range as discussed below. Neither the first zone nor the second zone need necessarily be continuous. For example, in FIG. 7, the second zone has four different areas that are not continuous within the projection range of the micro lens and the first zone has one continuous area.

Figure 5:
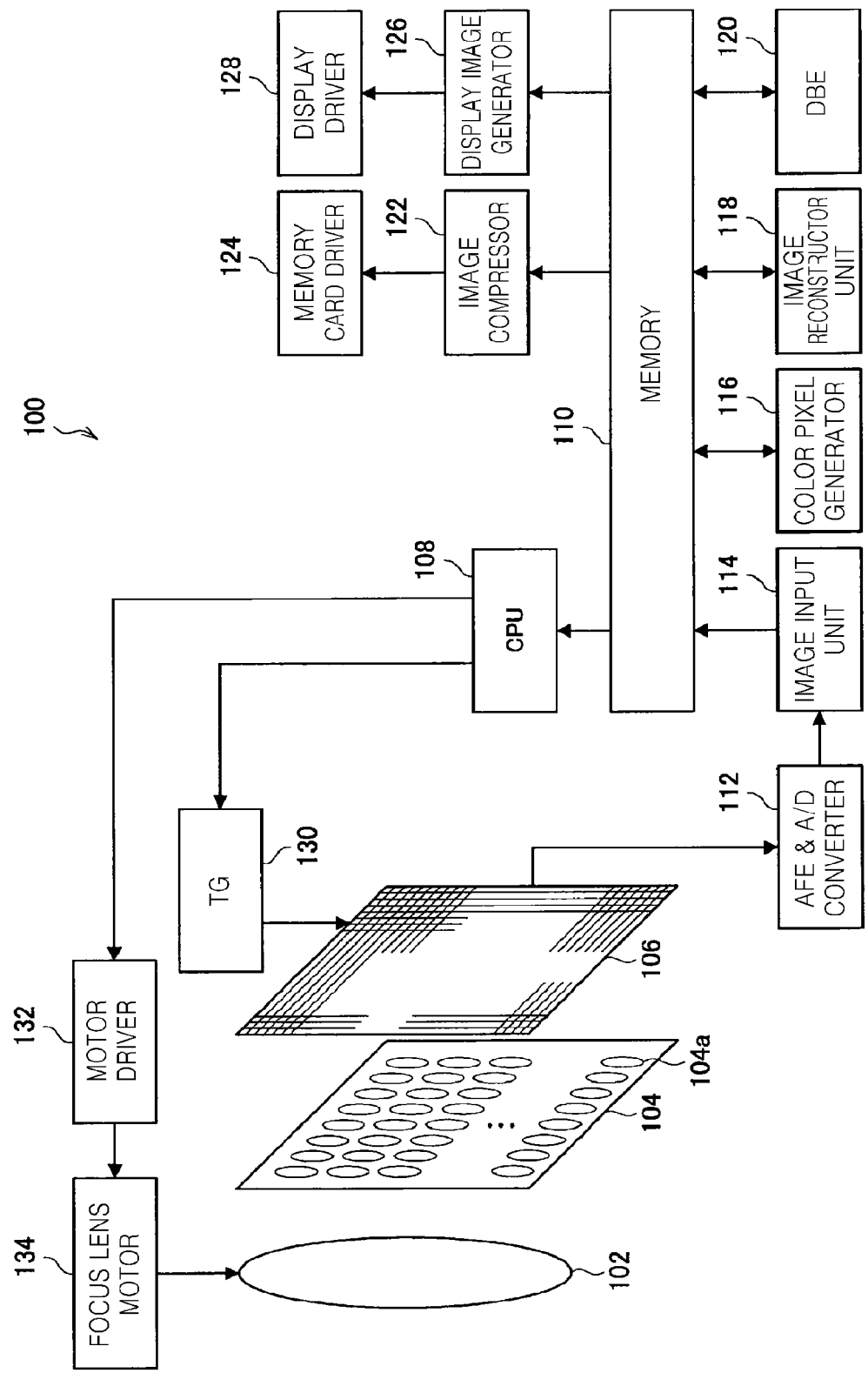
FIG. 5 is a block diagram of an example of an image pickup device.

FIG. 5 is a block diagram of an example of an image pickup device 100 according to an embodiment of the invention.

Referring to FIG. 5, the image pickup device 100 includes a main lens 102, a micro lens array 104, an image pickup sensor 106, a Central Processing Unit (CPU) 108, a memory 110, an Analog Front End (AFE) and Analog-to-Digital (A/D) converter 112, an image input unit 114, a color pixel generator 116, an image reconstruction unit 118, a Digital Back End (DBE) 120, an image compressor 122, a memory card driver 124, a display image generator 126, a display driver 128, a Timing Generator (TG) 130, a motor driver 132, and a focus lens motor 134.

The main lens 102 includes a focusing lens for focusing on an object and a zoom lens for changing a focusing distance. By moving a position of the focusing lens included in the main lens 102, the image pickup device 100 can focus on an object.

The micro lens array 104 is a lens array composed of a group of a plurality of micro lenses. The micro lens array 104 is constructed by arranging micro lenses 104a on a single plane. The micro lenses 104a may be regularly arranged on a single place. Light transmitted through the main lens 102 passes through each micro lens 104a of the micro lens array 104 and then strikes the image pickup sensor 106. The image pickup sensor 106 generates an image signal from the light striking the image pickup sensor 106.

The image pickup sensor 106 may have a predetermined light-receiving sensor pattern corresponding to each micro lens 104a. As described above, for each of the micro lens 104a, the image pickup sensor 106 is constructed to receive a brightness signal from pixels in a first zone used for image reconstruction and receive a color signal from pixels with a color filter in a second zone. The configuration of the image pickup sensor 106 will be described later.

The CPU 108 controls an operation of each unit of the image pickup device 100. The CPU 108 can control an operation of each unit of the image pickup device 100 by sequentially executing computer programs stored in the image pickup device 100. Information or data necessary in an operation of the image pickup device 100 is stored in the memory 110.

The AFE & A/D converter 112 receives an analog signal photoelectric-converted by the image pickup device 100 and outputs a digital signal by analog-to-digital converting the analog signal. The digital signal converted by the AFE & A/D converter 112 is transmitted to the image input unit 114.

The image input unit 114 receives the digital signal generated by the AFE & A/D converter 112 and stores the digital signal in the memory 110. By storing the digital signal generated by the AFE & A/D converter 112 in the memory 110, the image pickup device 100 can perform each kind of signal processing of the digital signal.

The color pixel generator 116 performs signal processing for generating color data for an image signal generated from light received by the image pickup sensor 106. In detail, the color pixel generator 116 generates color data for pixels in which color information does not exist out of the image signal generated the image pickup sensor 106. The color data generation in the color pixel generator 116 will be described later.

The image reconstruction unit 118 reconstructs an image picked up through the micro lens array 104. For example, by changing the DOF by reconstruction of an image picked up through the micro lens array 104, an object to be focused can be changed. In addition, the image reconstruction unit 118 can perform a resolution improvement process using noise cancellation or color correction.

The DBE 120 performs image processing of an image picked up through the micro lens array 104 and colored by the color pixel generator 116, for example, performs a saturation strengthening process or a process of changing an image size.

The image compressor 122 compresses image data in an appropriate format. An image compression format may be a reversible format or a non-reversible format. As an example of the appropriate format, the image data may be transformed in a Joint Photographic Experts Group (JPEG) format or a JPEG 2000 format. The memory card driver 124 records the image data compressed by the image compressor 122 into a memory card (not shown) and reads the image data recorded in the memory card from the memory card.

The display image generator 126 generates an image (a display image) displayed on a display unit (not shown) for displaying a captured image or every kinds of setup images of the image pickup device 100. For example, when a captured image is displayed on the display unit, the display image generator 126 compresses image data according to a resolution or a screen size of the display unit and generates a display image. The display driver 128 performs a process of displaying a display image generated by the display image generator 126 on the display unit.

The TG 130 sends a timing signal to the image pickup sensor 106. A shutter speed is determined in response to the timing signal received from the TG 130. That is, driving of the image pickup sensor 106 is controlled according to the timing signal received from the TG 130, and by receiving light from an object within a driving time of the image pickup sensor 106, an electrical signal for constructing image data is generated.

The motor driver 132 drives the focus lens motor 134 under a control of the CPU 108. The focus lens motor 134 controls a position of the main lens 102 by means of a motor. By controlling a position of the main lens 102 via the motor driver 132 and the focus lens motor 134, bringing an object into focus can be controlled.

Although not shown in FIG. 5, the image pickup device 100 can further include an iris, a motor for controlling the iris, and a motor driver for driving the motor. In addition, the image pickup device 100 can further include a shutter button for starting a capturing operation, an operation button for setting capturing information, such as iris, shutter speed, and sensitivity, etc.

The image pickup device 100 according to an embodiment of the invention has been described. A configuration of the image pickup sensor 106 used in the image pickup device 100 according to an embodiment of the invention will now be described.

Figure 6:
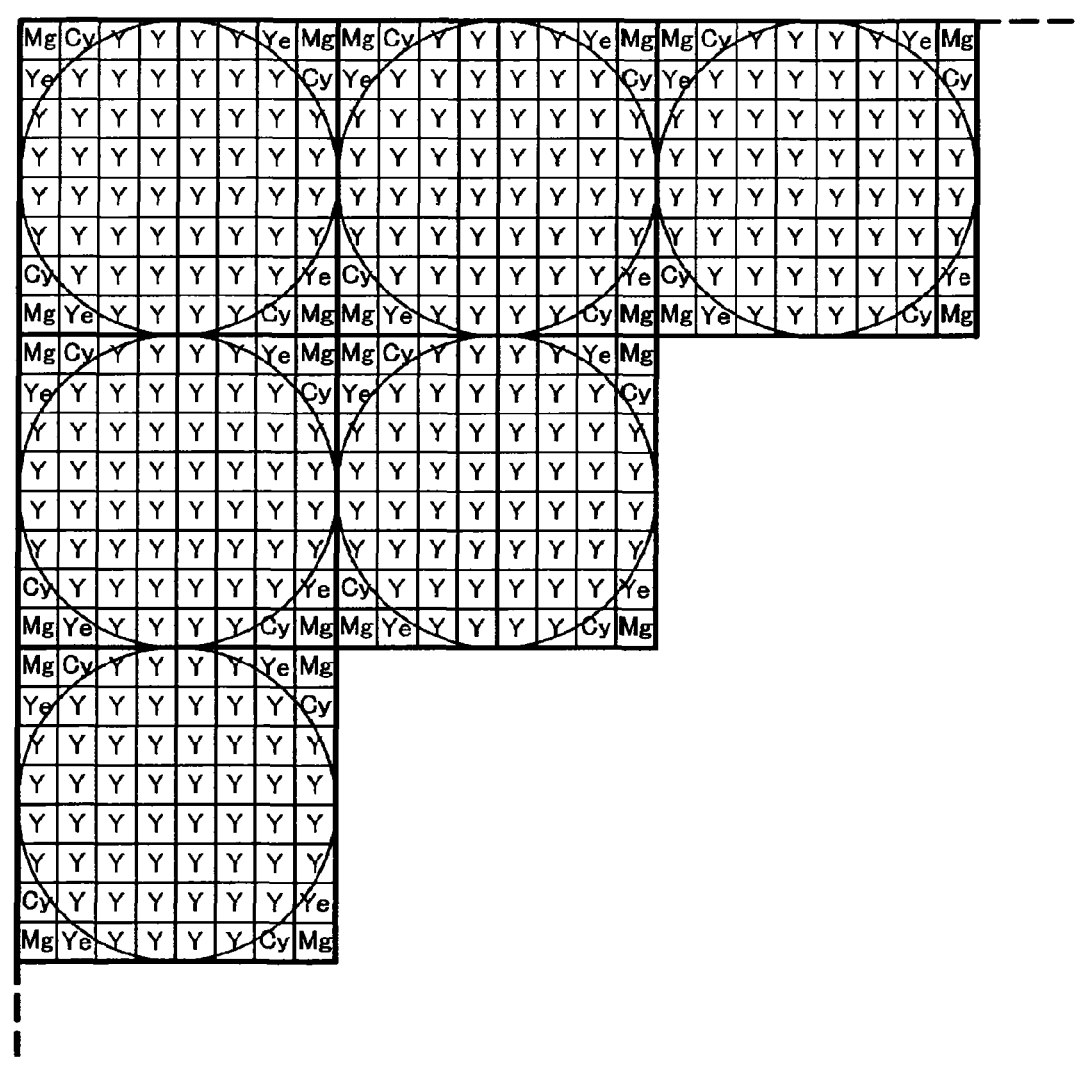

FIG. 6 illustrates an example of a configuration of the image pickup sensor 106 used in the image pickup device 100, and FIG. 7 is a magnified diagram of the image pickup sensor 106 of FIG. 6.

Each circle of the image pickup sensor 106 illustrated in FIG. 6 indicates a projection range in which light passing through a single micro lens 104a constituting the micro lens array 104 and strikes the pixels of projection range of the image pickup sensor 106. This is similar to the circle illustrated in FIG. 3. As illustrated in FIG. 6, a plurality of pixels are allocated to correspond to a projection range in which light passes through a single micro lens 104a and then strikes the image pickup sensor 106. In the example illustrated in FIGS. 6 and 7, 64 pixels (8 pixels along each side) are allocated to a single micro lens 104a, and light passing through a single micro lens 104a is converted to an electrical signal by striking the 64 pixels.

In the image pickup sensor 106 shown in FIGS. 6 and 7, the 64 pixels allocated to a single micro lens 104a are divided into a first zone in which pixels for obtaining a brightness signal are included and a second zone in which pixels for obtaining a complementary color signal are included. The first zone obtains a brightness signal and is used for a reconstruction process performed by the image reconstruction unit 118, The first zone may generally be around an optical axis of each micro lens. The second zone obtains a complementary color signal. In the image pickup sensor 106 illustrated in FIG. 6, the first zone is composed of pixels represented by Y for obtaining a brightness signal. The second zone is composed of pixels represented by Cy, Mg, and Ye and is for obtaining a complementary color signal. The pixels represented by Cy, Mg, and Ye are pixels for obtaining information on Cyan, Magenta, and Yellow, respectively.

FIG. 7 is a magnified diagram of 64 pixels allocated to a single micro lens 104a. The configuration of the image pickup sensor 106 will be described in more detail with reference to FIG. 7.

The first zone used for image reconstruction corresponds to pixels represented by Y00 to Y51. A complementary color filter is attached to each pixel in the second zone. The second zone is for image reconstruction in order to obtain information on Cyan, Magenta, and Yellow. Pixels for obtaining information on Cyan are represented by Cy0 to Cy3 in FIG. 7, pixels for obtaining information on Magenta are represented by Mg0 to Mg3 in FIG. 7, and pixels for obtaining information on Yellow are represented by Ye0 to Ye3 in FIG. 7. An RGB signal can be obtained from a brightness signal obtained by the light striking the pixels Y00 to Y51 and the light striking passing through the filters and striking the pixels Cy0 to Cy3, Mg0 to Mg3, and Ye0 to Ye3. The filters may be complementary filters.

Information on a luminous flux different from that in a zone for receiving a brightness signal can be obtained from pixels receiving a complementary color signal, and it is known that the complementary color signal has low sensitivity compared to the brightness signal. Accordingly, in embodiments, an RGB signal at a position where a brightness signal is received is generated in the image pickup sensor 106 by performing a calculation considering a weight according to a distance difference between the position where a brightness signal is received and each of positions where a plurality of complementary color signals are received.

Figure 8:
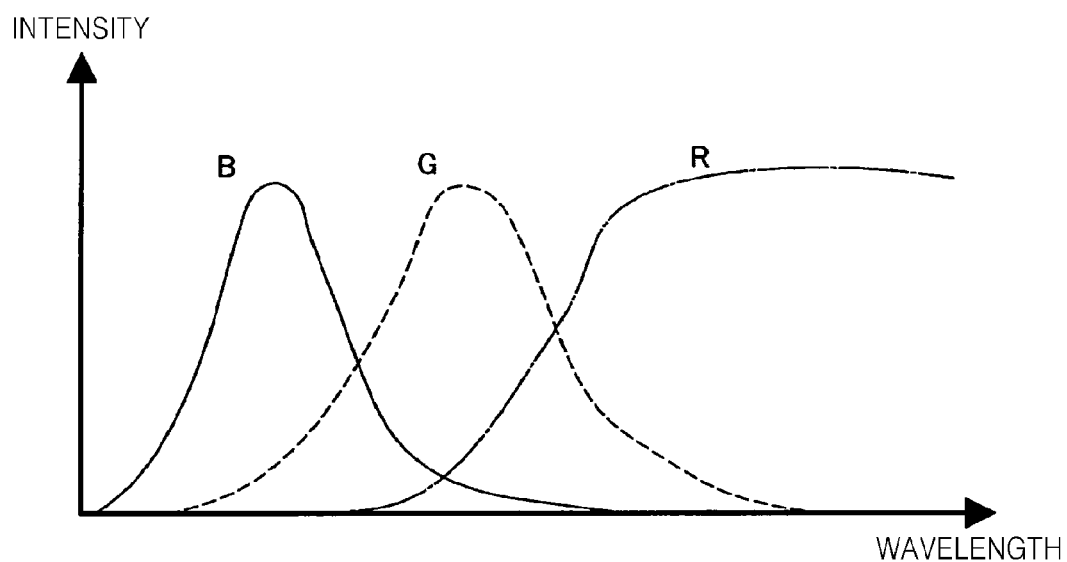
FIG. 8 illustrates a relationship between a wavelength and spectral intensity of each of the three primary colors R, G, B.
Figure 9:
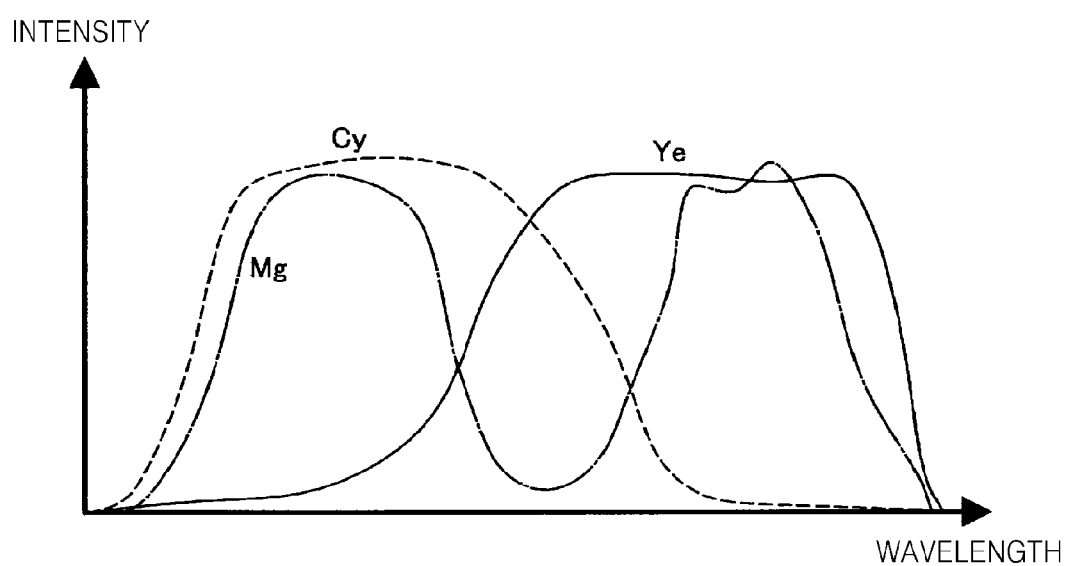
FIG. 9 illustrates a relationship between a wavelength and spectral intensity of each of Cyan, Magenta, and Yellow.
Figure 10:
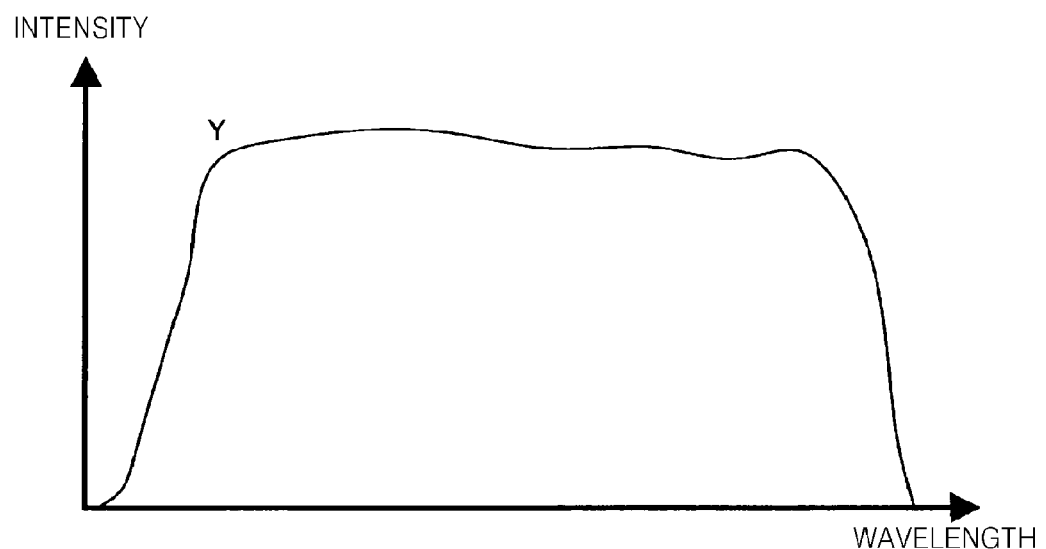
FIG. 10 illustrates a relationship between a wavelength and spectral intensity of a brightness signal.

FIG. 8 illustrates an example of a relationship between a wavelength and spectral intensity of each of the three primary colors R, G, B, FIG. 9 illustrates an example of a relationship between a wavelength and spectral intensity of each of Cyan, Magenta, and Yellow, and FIG. 10 illustrates an example of a relationship between a wavelength and spectral intensity of a brightness signal. As illustrated in FIGS. 8 to 10, the relationship between a wavelength and spectral intensity of a brightness signal depends on the relationship between a wavelength and spectral intensity of each of Cyan, Magenta, and Yellow, which is illustrated in FIG. 9. Accordingly, an RGB signal at a position where a brightness signal is received is generated by performing a calculation considering a weight according to a distance difference between the position where a brightness signal is received and each of positions where a plurality of complementary color signals are received.

The configuration of the image pickup sensor 106 used for the image pickup device 100 has been described. An example of an image pickup method using the image pickup device 100 and a method of generating a color image will now be described.

Figure 11:
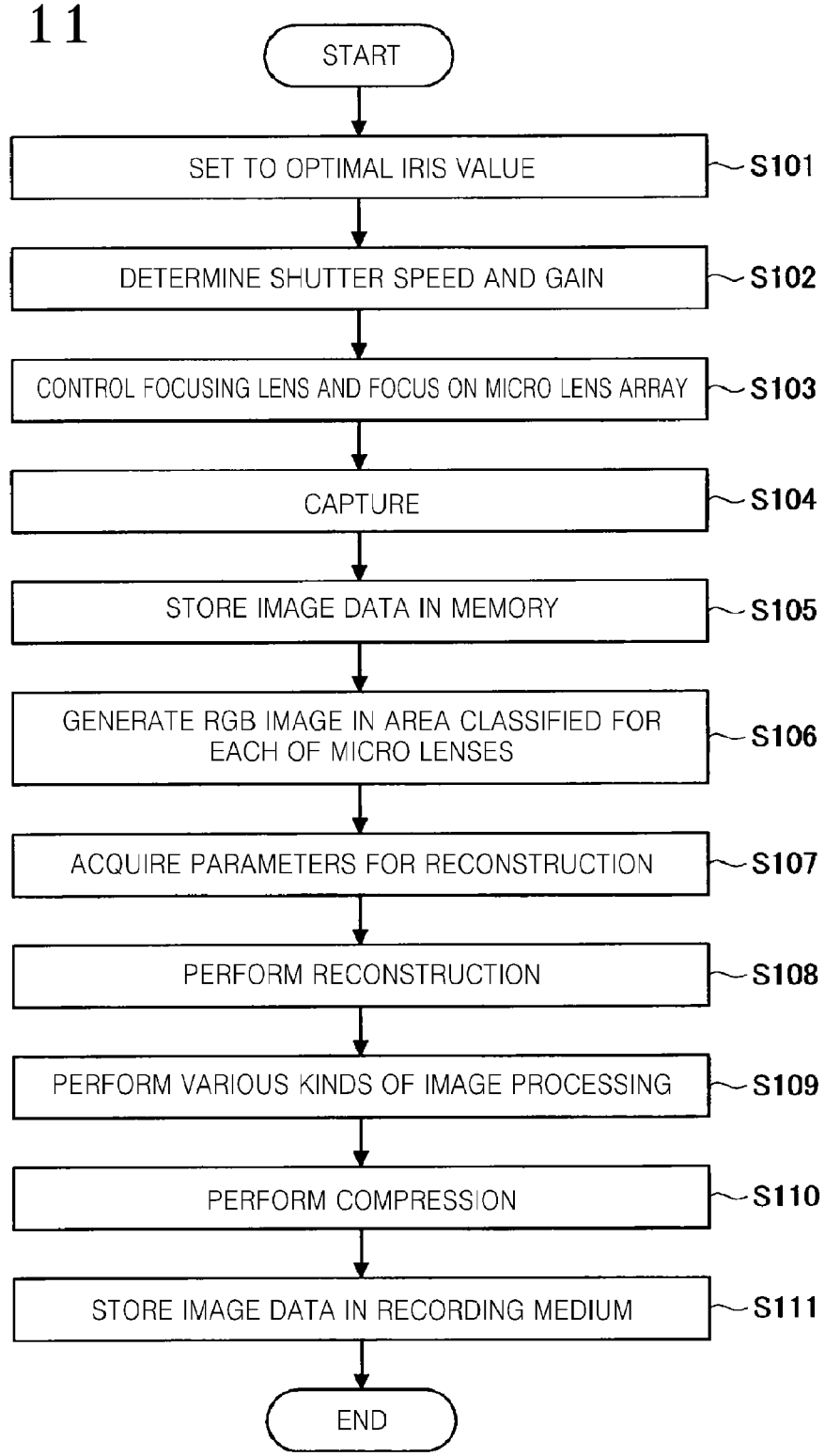
FIG. 11 is a flowchart illustrating an example of an image pickup method using the image pickup device.
Figure 12:
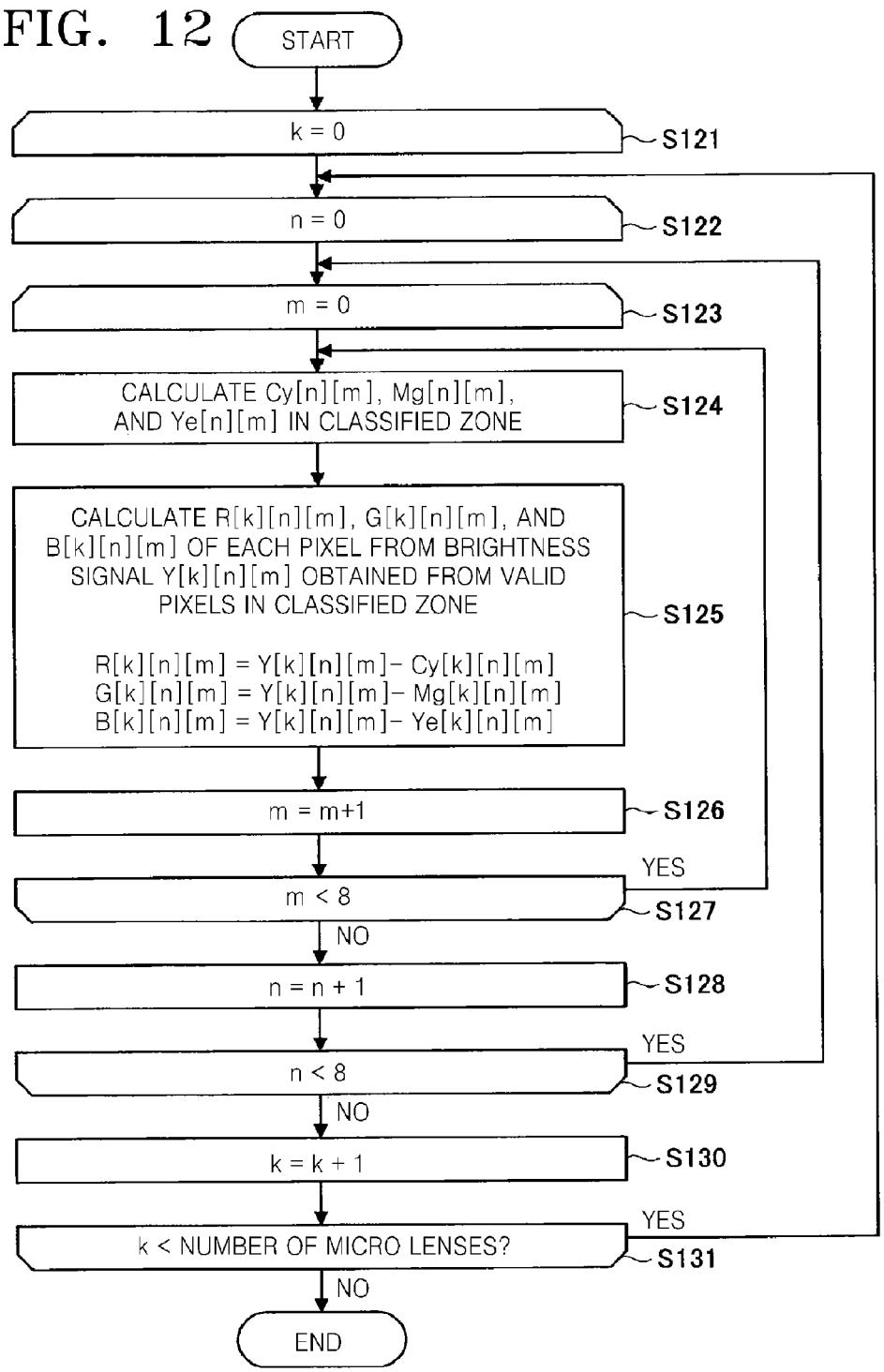
FIG. 12 is a flowchart illustrating an example of a method of generating a color image in the image pickup device.

FIG. 11 is a flowchart illustrating an example of an image pickup method using the image pickup device 100 according to an embodiment of the invention. FIG. 12 is a flowchart illustrating an example of a method of generating a color image in the image pickup device 100.

Referring to FIGS. 11 and 12, when an object is photographed using the image pickup device 100 according to an embodiment of the invention, an optimal iris value is set automatically using a light measurement result of the object or by a user in operation S101, and in operation S102, an optimal shutter speed for capturing the object is set automatically using the light measurement result of the object or by the user, and a gain for capturing an image is set. In operation S103, a main object is focused on the micro lens array 104 by the motor driver 132 and the focus lens motor 134 moving a position of a focusing lens.

Once the main object is focused on the micro lens array 104, a capturing process in the image pickup device 100 is performed by pushing a shutter button in operation S104. The capturing process in the image pickup device 100 is performed by image light from the object striking the image pickup sensor 106. The light striking the image pickup sensor 106 is controlled by the timing generator 130 so that the light strikes the image pickup sensor 106 for only an interval of the shutter speed set in operation S102. The light from the object is blocked from entering the photo detecting device when the shutter is closed.

Once the image light from the object strikes the image pickup sensor 106 by passing through the main lens 102 and passing through the micro lens array 104, the image light is converted by the image pickup sensor 106 from light to an electric signal. The electrical signal generated by the image pickup sensor 106 is converted to a digital signal by the AFE & A/D converter 112, and the converted digital signal is stored in the memory 110 as image data by the image input unit 114 in operation S105.

Once the image data is stored in the memory 110, the color pixel generator 116 reads the image data stored in the memory 110 and generates an RGB image in an area classified for each of the micro lenses 104*a* in operation S106. The RGB image generation in the color pixel generator 116 will be described in detail later.

When the RGB image generation in the color pixel generator 116 is finished in operation S106, the image reconstruction unit 118 acquires parameters for reconstruction used in an image reconstruction process in operation S107. The parameters for reconstruction used in an image reconstruction process can include distance information from the image pickup device 100 to the object and information on a pitch between micro lenses 104*a* constituting the micro lens array 104.

When the acquisition of the parameters for reconstruction in the image reconstruction unit 118 is finished in operation S107, the image reconstruction unit 118 performs a reconstruction process of the image data using the acquired parameters in operation S108. By reconstructing the image data in the image reconstruction unit 118, an image focused on an object different from the photographed object can be generated. The reconstruction process of image data is well-known to one of ordinary skill in the art.

When the reconstruction process of the image data in the image reconstruction unit 118 is finished in operation S108, the DBE 120 performs various kinds of image processing for the image data after reconstruction in operation S109. Herein, the image processing can include, for example, noise cancellation, saturation strengthening, and image size change. The image data on which the image processing is performed is stored in the memory 110.

When the image processing is finished by the DBE 120 in operation S109, the image compressor 122 compresses in operation S110 the image data on which the image processing has been performed. When the compression of the image data is finished, the memory card driver 124 stores the compressed image data in a recording medium in operation S111.

An example of an image pickup method using the image pickup device 100 has been described. The RGB image generation in the color pixel generator 116 described in operation S106 of FIG. 11 will now be described in detail with reference to FIG. 12.

FIG. 12 is a flowchart illustrating an example of the RGB image generation in the color pixel generator 116 described in operation S106 of FIG. 11. Herein, as illustrated in FIGS. 6 and 7, a case where an area of 64 pixels (8 pixels along each side) corresponds to a single micro lens 104*a* is illustrated.

The color pixel generator 116 sets a variable k indicating the number of micro lenses 104*a* constituting the micro lens array 104 to 0 in operation S121. Once the variable k is set to 0 in operation S121, the color pixel generator 116 sets a variable n representing an element of a column in a case where an area of 64 pixels (8 pixels along each side) is replaced with an 8×8 matrix to 0 in operation S122 and a variable m representing an element of a row of the matrix to 0 in operation S123.

When the variables are set to 0, the color pixel generator 116 calculates values of Cyan (Cy[n][m]), Magenta (Mg[n][m]), and Yellow (Ye[n][m]) in a zone classified in the area of 64 pixels in operation S124. Herein, each of Cy[n][m], Mg[n][m], and Ye[n][m] is calculated with a weighted average according to distances from the four corners of the area of 64 pixels. A distance between a pixel to be calculated and each pixel in the four corners is calculated. Distances d0, d1, d2, and d3 between the pixel to be calculated and the pixels in the four corners can be represented using Equations 1 to 4, respectively. In addition, since positions of pixels of Cy, Mg, and Ye are different in the four corners as illustrated in FIG. 7, the distances d0, d1, d2, and d3 between the pixel to be calculated and the pixels of each of Cy, Mg, and Ye in the four corners are different according to Cyan, Magenta, and Yellow. Accordingly, Equations 1 to 4 are differently represented for Cyan, Magenta, and Yellow. Other methods of calculating the distances may be used. For simplicity of the description, distinction between d0, d1, d2, and d3 for pixels of Cyan, Magenta, and Yellow will be omitted.

$$d0 = \sqrt{(n-0)^2 + (m-0)^2} \qquad \text{Equation (1):}$$

$$d1 = \sqrt{(n-7)^2 + (m-0)^2} \qquad \text{Equation (2):}$$

$$d2 = \sqrt{(n-0)^2 + (m-7)^2} \qquad \text{Equation (3):}$$

$$d3 = \sqrt{(n-7)^2 + (m-7)^2} \qquad \text{Equation (4):}$$

Once the color pixel generator 116 calculates the distances d0, d1, d2, and d3 between the pixel to be calculated and the pixels in the four corners, the color pixel generator 116 calculates a sum d of the distances d0, d1, d2, and d3 between the pixel to be calculated and the pixels in the four corners, which have been calculated using Equations 1 to 4, by using Equation 5.

$$d = d0 + d1 + d2 + d3 \qquad \text{Equation (5):}$$

Once the sum d of the distances d0, d1, d2, and d3 between the pixel to be calculated and the pixels in the four corners is calculated, Cy[n][m], Mg[n][m], and Ye[n][m] can be calculated. Cy[n][m], Mg[n][m], and Ye[n][m] can be calculated using Equations 6 to 8 by using the sum d of the distances d0, d1, d2, and d3 between the pixel to be calculated and the pixels in the four corners, which has been calculated using Equation 5. In Equations 6 to 8, Cy0, Cy1, Cy2, and Cy3 denote values of Cyan in pixels of Cy0, Cy1, Cy2, and Cy3 shown in FIG. 7, Mg0, Mg1, Mg2, and Mg3 denote values of Magenta in pixels of Mg0, Mg1, Mg2, and Mg3 shown in FIG. 7, and Ye0, Ye1, Ye2, and Ye3 denote values of Yellow in pixels of Ye0, Ye1, Ye2, and Ye3 shown in FIG. 7.

$$Cy[n][m] = \frac{Cy0 \times (d-d0) + Cy1 \times (d-d1) + Cy2 \times (d-d2) + Cy3 \times (d-d3)}{d} \quad \text{Equation (6)}$$

$$Mg[n][m] = \frac{Mg0 \times (d-d0) + Mg1 \times (d-d1) + Mg2 \times (d-d2) + Mg3 \times (d-d3)}{d} \quad \text{Equation (7)}$$

$$Ye[n][m] = \frac{Ye0 \times (d-d0) + Ye1 \times (d-d1) + Ye2 \times (d-d2) + Ye3 \times (d-d3)}{d} \quad \text{Equation (8)}$$

Once Cy[n][m], Mg[n][m], and Ye[n][m] are calculated, the color pixel generator 116 calculates values of R[n][m], G[n][m], and B[n][m] of the pixels in the classified zone using a brightness signal Y[k][n][m] in the zone classified in the area of the 64 pixels in operation S125. Since R, G, and B are complementary colors of Cy, Mg, and Ye, values of R, G, and B of each pixel can be deducted by subtracting Cy[n][m], Mg[n][m], and Ye[n][m] from a brightness signal Y[k][n][m] of a corresponding pixel, respectively. R[n][m], G[n][m], and B[n][m] can be calculated using Equations 9 to 11.

$$R[n][m] = Y[n][m] - Cy[n][m] \quad \text{Equation (9):}$$

$$G[n][m] = Y[n][m] - Mg[n][m] \quad \text{Equation (10):}$$

$$B[n][m] = Y[n][m] - Ye[n][m] \quad \text{Equation (11):}$$

Once R[n][m], G[n][m], and B[n][m] are calculated in operation S125, the color pixel generator 116 increases the value of m by 1 in operation S126. Thereafter, the color pixel generator 116 determines in operation S127 whether the value of m is less than 8. If it is determined that the value of m is less than 8, the process goes back to operation S124. If it is determined that the value of m is equal to or greater than 8, the color pixel generator 116 increases the value of n by 1 in operation S128. Thereafter, the color pixel generator 116 determines in operation S129 whether the value of n is less than 8. If it is determined that the value of n is less than 8, the process goes back to operation S123, resetting the value of m. If it is determined that the value of n is equal to or greater than 8, this means that values of R, G, and B for all of the 64 pixels allocated to a single micro lens 104a have been calculated. Accordingly, the color pixel generator 116 increases the value of k by 1 in operation S130. Thereafter, the color pixel generator 116 determines in operation S131 whether the value of k is less than the number of micro lenses 104a constituting the micro lens array 104. If it is determined that the value of k is less than the number of micro lenses 104a, the process goes back to operation S122, resetting the value of n. If it is determined that the value of k is equal to or greater than the number of micro lenses 104a, this means that values of R, G, and B for all micro lenses 104a have been calculated. Accordingly, the process ends.

Although Cy[n][m], Mg[n][m], and Ye[n][m] are simply calculated by using weighted averages according to distances from four corners in Equations 6 to 8, the invention is not limited to this. In the illustration shown in FIGS. 6 and 7, since a complementary color part for acquiring information on Cyan, Magenta, and Yellow is located outside of each circle, this can be considered a case where light passing through each micro lens 104a does not sufficiently reach the complementary color part. Accordingly, when light intensity of the complementary color part is insufficient, the right parts, which are averaged in Equations 6 to 8, can be changed based on an actual light intensity. For example, as shown in Equations 12 to 14, Cy[n][m], Mg[n][m], and Ye[n][m] can be calculated using a predetermined coefficient α.

$$Cy[n][m] = \alpha \times \frac{Cy0 \times (d-d0) + Cy1 \times (d-d1) + Cy2 \times (d-d2) + Cy3 \times (d-d3)}{d} \quad \text{Equation (12)}$$

$$Mg[n][m] = \alpha \times \frac{Mg0 \times (d-d0) + Mg1 \times (d-d1) + Mg2 \times (d-d2) + Mg3 \times (d-d3)}{d} \quad \text{Equation (13)}$$

$$Ye[n][m] = \alpha \times \frac{Ye0 \times (d-d0) + Ye1 \times (d-d1) + Ye2 \times (d-d2) + Ye3 \times (d-d3)}{d} \quad \text{Equation (14)}$$

Although the same coefficient α is used for Cy[n][m], Mg[n][m], and Ye[n][m] in Equations 12 to 14, the invention is not limited to this. Alternatively, different coefficients can be used for Cy[n][m], Mg[n][m], and Ye[n][m], or a coefficient for any two of Cy[n][m], Mg[n][m], and Ye[n][m] can be different from that of the other one.

Figure 13:
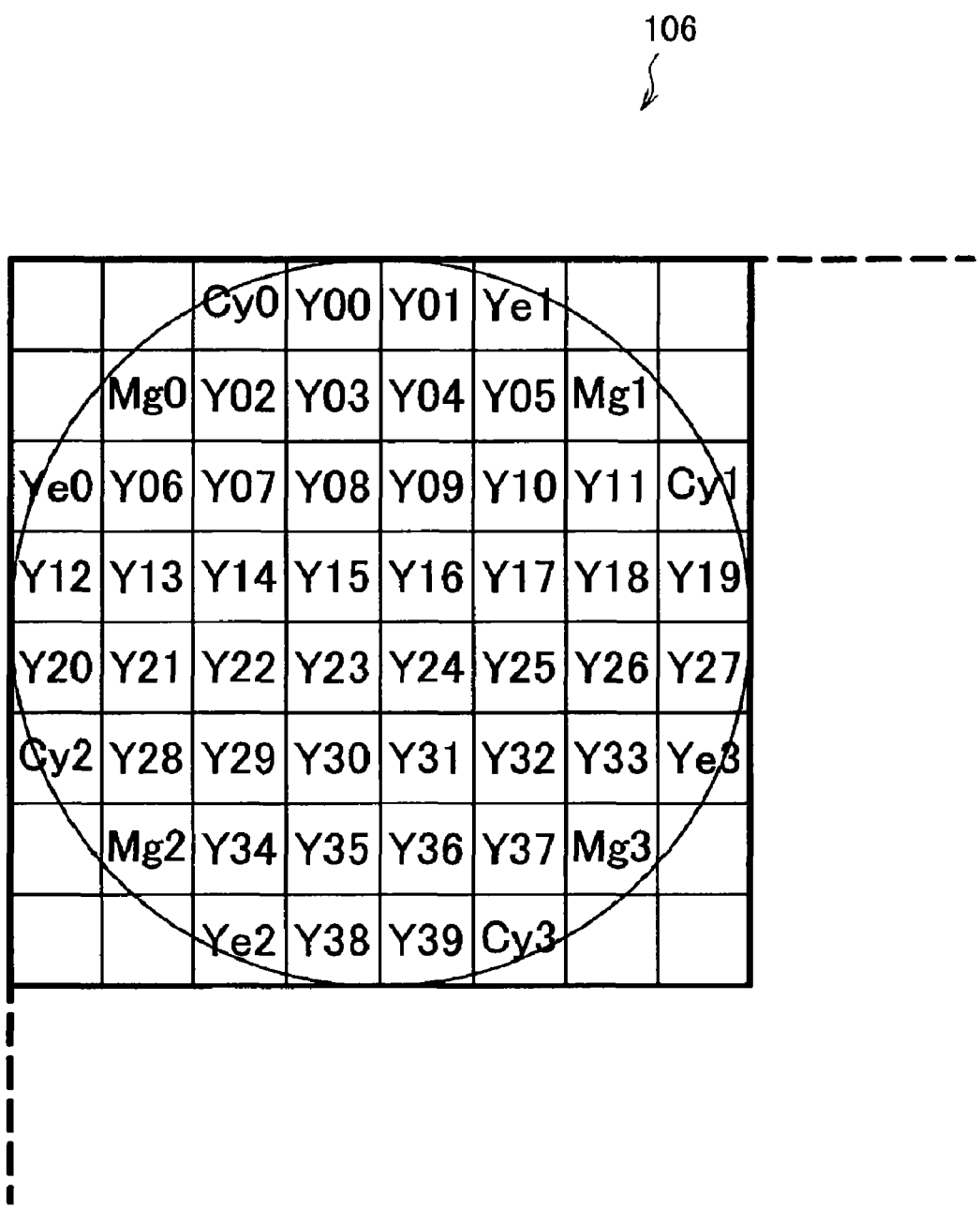
FIG. 13 illustrates a modified configuration of the image pickup sensor.

In addition, to compensate for the lack of light intensity of the complementary color part, the image pickup sensor 106 can be constructed so that the complementary color part is located inside of a zone on which light passing through each micro lens 104a strikes the image pickup sensor 106, for example, as illustrated in FIG. 13. In the illustration shown in FIG. 13, pixels for acquiring information on Cyan are represented as Cy0 to Cy3, pixels for acquiring information on Magenta are represented as Mg0 to Mg3, and pixels for acquiring information on Yellow are represented as Ye0 to Ye3. In addition, an ROB signal can be obtained from a brightness signal acquired by light passing through each micro lens 104a and striking a zone composed of Y00 to Y39 of FIG. 13 and referring to information on Cyan, Magenta, and Yellow acquired by the light passing through each micro lens 104a and striking pixels Cy0 to Cy3, Mg0 to Mg3, and Ye0 to Ye3.

Figure 14:
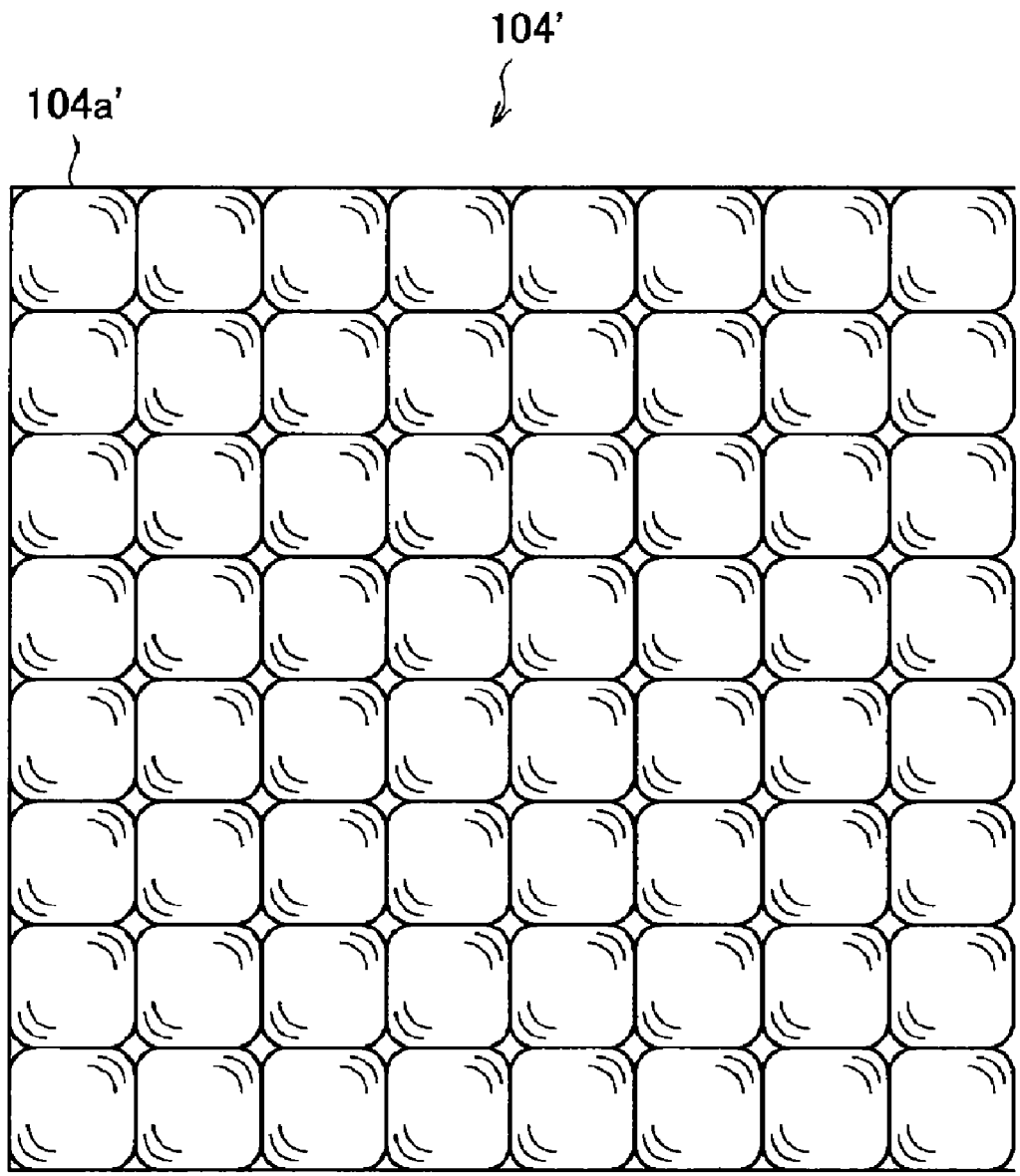
FIG. 14 illustrates an example of a configuration of a micro lens array.

In addition, to compensate for the lack of light intensity of the complementary color part, the micro lens array 104 can be replaced. For example, a micro lens array 104' in which rectangular micro lenses 104a' are regularly arranged as illustrated in FIG. 14 can be used instead. By using the rectangular micro lenses 104a', a range of light passing through the micro lenses 104a' and striking the image pickup sensor 106 can be increased, thereby providing more light for supplementing the lack of light intensity of the complementary color part.

The generation of an ROB image in the color pixel generator has been described.

Figure 16:
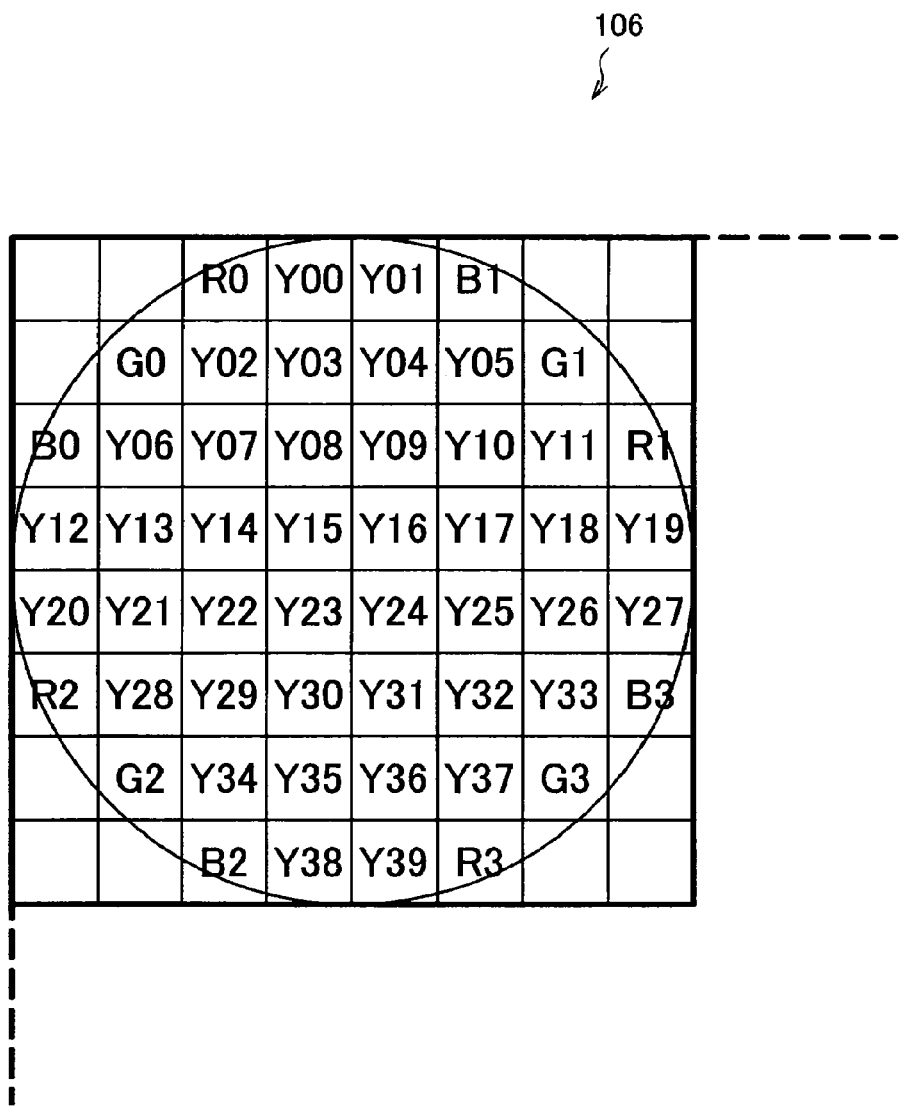
FIG. 16 illustrates an example of a configuration of an image pickup sensor having attached thereto a primary color filter for obtaining information on red, green, and blue.

In addition, although a case of using the image pickup sensor 106 to which a complementary color filter for obtaining information on Cyan, Magenta, and Yellow is attached has been described, the invention is not limited to this. In embodiments, an image pickup sensor to which a primary color filter for acquiring information on Red, Green, and Blue is attached can be applied. FIGS. 15 and 16 illustrate an example of a configuration of an image pickup sensor in which a primary color filter for obtaining information on Red, Green, and Blue is attached. The illustration shown in FIG. 15 is an example of having the same configuration as that of the image pickup sensor to which a complementary color filter is attached shown in FIG. 7. Pixels used for image reconstruction correspond to pixels represented as Y00 to Y51 shown in FIG. 15. A primary color filter is attached to each of pixels in the other zone, acquiring information on Red, Green, and Blue. Values of R[n][m], G[n][m], and B[n][m] of each pixel in FIG. 15 can be calculated using Equations 15 to 20. In addition, for calculating distances d0, d1, d2, and d3 between a pixel to be calculated and pixels in the four corners and a sum d of the distances d0, d1, d2, and d3, Equations 1 to 5 are used.

$$Rref[n][m] = \frac{(R0 \times (d-d0) + R1 \times (d-d1) + R2 \times (d-d2) + R3 \times (d-d3))}{d} \quad \text{Equation (15)}$$

$$Gref[n][m] = \frac{(G0 \times (d-d0) + G1 \times (d-d1) + G2 \times (d-d2) + G3 \times (d-d3))}{d} \quad \text{Equation (16)}$$

$$Bref[n][m] = \frac{(B0 \times (d-d0) + B1 \times (d-d1) + B2 \times (d-d2) + B3 \times (d-d3))}{d} \quad \text{Equation (17)}$$

$$R[n][m] = Y[n][m] \times \frac{Rref[n][m]}{(Rref[n][m] + Gref[n][m] + Bref[n][m])} \quad \text{Equation (18)}$$

$$G[n][m] = Y[n][m] \times \frac{Gref[n][m]}{(Rref[n][m] + Gref[n][m] + Bref[n][m])} \quad \text{Equation (19)}$$

$$B[n][m] = Y[n][m] \times \frac{Bref[n][m]}{(Rref[n][m] + Gref[n][m] + Bref[n][m])} \quad \text{Equation (20)}$$

FIG. 16 shows the same configuration as that of the image pickup sensor 106 constructed so that the complementary color part is located inside a zone on which light passing through each micro lens 104a strikes the image pickup sensor 106, which is illustrated in FIG. 13. As illustrated in FIG. 16, the image pickup sensor 106 can be constructed so that a primary color part for acquiring information on Red, Green, and Blue is located inside a zone on which light passing through each micro lens 104a strikes the image pickup sensor 106.

As described above, when a color image signal is generated from transmission light of the micro lens array 104, an area to which a plurality of pixels of the image pickup sensor 106 is allocated corresponds to a single micro lens 104a. The area is divided into a first zone on an optical axis of each micro lens 104a to acquire a brightness signal and a second zone to acquire a complementary color signal or a primary color signal. In embodiments, the second zone is around the first zone.

When the color image signal is generated, complementary color data or primary color data of each pixel in the area is calculated using weighted averages according to distances from pixels in four corners of the area, and color information of each pixel is calculated using complementary color data or primary color data of a corresponding pixel and brightness data of the corresponding pixel.

Embodiments of the invention have the advantage that since a brightness interpolation process using neighboring pixels is not performed, deterioration of a resolution or an unnatural error pattern in a surrounding part does not occur, and since weighted average values from a wide range are used, the occurrence of a false color due to phase transition can be reduced compared to a conventional case of using Bayer interpolation used for digital still cameras.

Although examples of embodiments of the invention have been described in detail with reference to the attached drawings, the invention is not limited to these examples. Various kinds of changes or modifications can be performed by one of ordinary skill in the art within the scope of the technical spirit disclosed in the claims, and it is understood that those changes or modifications belong to the technical scope of the invention.

For example, although the image pickup sensor 106 acquires a brightness signal in a zone on an optical axis of each micro lens 104a and a complementary color signal or a primary color signal in a surrounding zone of the zone in an embodiment of the invention, the invention is not limited to this. On the contrary, the image pickup sensor 106, for example, may acquire a complementary color signal or a primary color signal in a zone on an optical axis of each micro lens 104a and a brightness signal in a surrounding zone of the complementary color zone.

Figure 17:
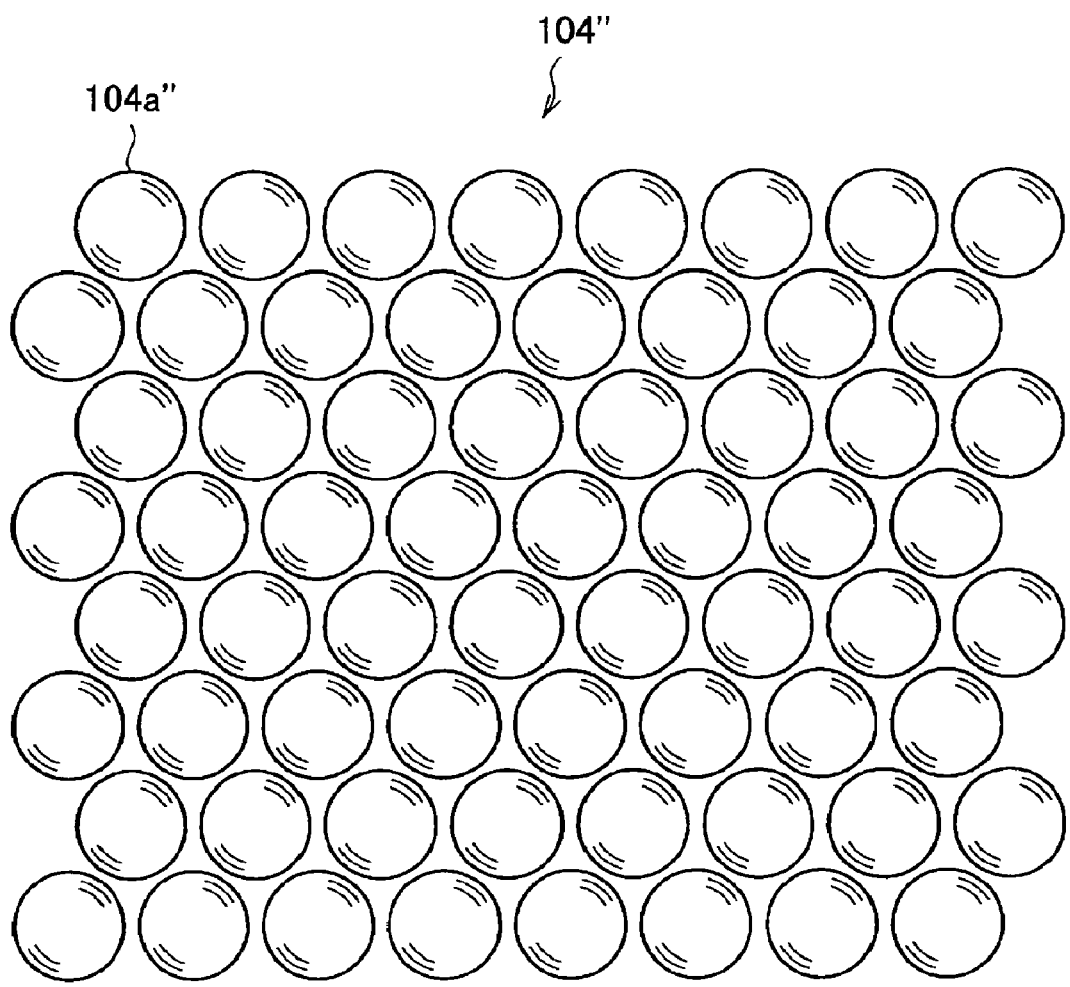
FIG. 17 illustrates an example of a configuration of the micro lens array.

In addition, although the micro lens array 104 has a configuration in which the micro lenses 104a are arranged in the form of a lattice, the invention is not limited to this. Micro lenses constituting a micro lens array may be arranged in, for example, the form of a honeycomb besides the form of a lattice. FIG. 17 illustrates an example of a micro lens array 104" in which micro lenses 104a" are regularly arranged in the form of a honeycomb. In addition, although a shape of each of the micro lens 104a" constituting the micro lens array 104" having a honeycomb structure is a circle, the invention is not limited to this.

Embodiments above illustrate that in an optical system having a lens array composed of a group of micro lenses, a color image can be obtained without significant deterioration due to the lens array.

The various illustrative logics, method steps, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

While this invention has been particularly shown and described with reference to examples of embodiments thereof, it will be understood by those of ordinary skill in the art that various changes in form and details may be made therein without departing from the spirit and scope of the invention as defined by the appended claims. The examples of embodiments should be considered in descriptive sense only and not for purposes of limitation. Therefore, the scope of the invention is defined not by the detailed description of the examples but by the appended claims, and all differences within the scope will be construed as being included in the invention.

What is claimed is:

1. A photo detecting device comprising:
   a lens array having a plurality of lenses; and
   a photoelectric converter having a plurality of photoelectric conversion areas, each area comprising a plurality of pixels which generate electrical signals from light passing through a corresponding lens of the lens array and striking at least one of the plurality of pixels;
   wherein each of the photoelectric conversion areas has a first zone and a second zone, wherein the second zone has a spectrum sensitivity characteristic different from a spectrum sensitivity characteristic of the first zone,
   wherein the first zone is generally centered on an optical axis of the corresponding lens and the second zone is outside of the first zone.

2. The photo detecting device of claim 1, wherein the first zone comprises a spectrum sensitivity characteristic corresponding to a brightness signal, and the second zone comprises a spectrum sensitivity characteristic corresponding to a color signal.

3. The photo detecting device of claim 1, wherein each of the plurality of photoelectric conversion areas comprises the same arrangement pattern of spectrum characteristics of the pixels.

4. The photo detecting device of claim 1, wherein the plurality of pixels are mounted on a generally flat surface.

5. The photo detecting device of claim 2, wherein the second zone generates a color signal by using color filters.

6. The image pickup device of claim 5, wherein the color filter is a complementary color filter.

7. The image pickup device of claim 5, wherein the color filter is a primary color filter.

8. The photo detecting device of claim 5, wherein the color signal includes information on Cyan, Magenta, and Yellow.

9. The photo detecting device of claim 5, wherein the color signal comprises information on Red, Green, and Blue.

10. The photo detecting device of claim 1, wherein the plurality of lenses is regularly arranged on a single plane.

11. The photo detecting device of claim 2, further comprising a color signal generator for generating a color signal by performing a weighted calculation according to a distance difference between a position where the brightness signal is received and a position in which the color signal is received.

12. The photo detecting device of claim 2, wherein the first zone is used for image reconstruction and the second zone is used for color reconstruction.

13. The photo detecting device of claim 1, wherein the light passes through a main lens before passing through the corresponding lens.

14. A photo detecting device comprising:
   a lens array having a plurality of lenses; and
   a photoelectric converter having a plurality of photoelectric conversion areas, each area comprising a plurality of pixels which generate electrical signals from light passing through a corresponding lens of the lens array and striking at least one of the plurality of pixels;
   wherein each of the photoelectric conversion areas has a first zone and a second zone, wherein the second zone has a spectrum sensitivity characteristic different from a spectrum sensitivity characteristic of the first zone,
   wherein the second zone is generally centered on an optical axis of the corresponding lens and the first zone is outside of the first zone.

15. An image pickup device comprising:
   a lens array having a plurality of lenses; and
   a photoelectric converter having a plurality of photoelectric conversion areas, each area comprising a plurality of pixels which generate electrical signals from light passing through a corresponding lens of the lens array;
   wherein each of the areas has a first zone and a second zone, wherein the second zone has a spectrum sensitivity characteristic different from a spectrum sensitivity characteristic of the first zone,
   wherein the first zone is generally centered on an optical axis of the corresponding lens and the second zone is outside of the first zone.

16. A method of reconstructing an image on a photo detecting device, including:
   generating electrical signals in each of a plurality of photoelectric conversion areas from light incident to the image passing through a corresponding lens of a lens array and striking at least one of a plurality of photoelectric conversion areas, wherein each area comprises a plurality of pixels, and each of the areas has a first zone of pixels and a second zone of pixels, and wherein the second zone of pixels has a spectrum sensitivity characteristic different from a spectrum sensitivity characteristic of the first zone of pixels,
   wherein the first zone is generally centered on an optical axis of the corresponding lens and the second zone is outside of the first zone.

17. The method of claim 16, wherein the first zone of pixels comprises a spectrum sensitivity characteristic so that the first zone generates a brightness signal, and the second zone of pixels comprises a spectrum sensitivity characteristic so that the second zone generates a color signal.

18. The method of claim 16, further comprising:
   generating a color signal by performing a weighted calculation according to a distance difference between a position where the brightness signal is received and a position in which the color signal is received.

19. The method of claim 16, further comprising:
   reconstructing the image using the signals from the first zone; and
   reconstructing a color of the image using the signals from the second zone.

* * * * *